United States Patent
Kemmer

(10) Patent No.: US 10,236,523 B2
(45) Date of Patent: Mar. 19, 2019

(54) SIMPLIFICATION OF THE ELECTRICAL SYSTEM OF FUEL CELLS BY MEANS OF DEPLETION OF THE CATHODE SUPPLY

(71) Applicant: Robert Bosch GmbH, Stuttgart (DE)

(72) Inventor: Helerson Kemmer, Vaihingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/911,328

(22) PCT Filed: Jun. 30, 2014

(86) PCT No.: PCT/EP2014/063816
§ 371 (c)(1),
(2) Date: Feb. 10, 2016

(87) PCT Pub. No.: WO2015/022114
PCT Pub. Date: Feb. 19, 2015

(65) Prior Publication Data
US 2016/0204455 A1    Jul. 14, 2016

(30) Foreign Application Priority Data

Aug. 14, 2013   (DE) .................. 10 2013 216 156

(51) Int. Cl.
*H01M 8/04225*    (2016.01)
*H01M 8/04302*    (2016.01)
(Continued)

(52) U.S. Cl.
CPC ..... *H01M 8/04225* (2016.02); *H01M 8/0488* (2013.01); *H01M 8/0491* (2013.01);
(Continued)

(58) Field of Classification Search
None
See application file for complete search history.

(56) References Cited

U.S. PATENT DOCUMENTS 5,798,186 A * 8/1998 Fletcher ............ H01M 8/04007
429/429
2001/0051291 A1   12/2001 Aoyagi et al.
(Continued)

FOREIGN PATENT DOCUMENTS

DE    19620501    6/1997
DE    10127892    10/2003
(Continued)

OTHER PUBLICATIONS

Hoffman (DE 19620501) (Abstract) (Jun. 19, 1997).*
(Continued)

*Primary Examiner* — Carmen V Lyles-Irving
(74) *Attorney, Agent, or Firm* — Michael Best & Friedrich LLP

(57) ABSTRACT

A fuel cell system. The fuel cell system includes at least one fuel cell having an anode chamber and a cathode chamber separated from the anode chamber, and a cathode gas source, a gas supply line connected to the cathode gas source, for feeding cathode gas into the cathode chamber, and an exhaust air line connected to the cathode chamber for the conducting exhaust air out of the cathode chamber. The gas supply line and the exhaust air line are connected by at least one gas flow regulation element, which opens the gas supply line in the direction of the exhaust air line and/or the exhaust air line in the direction of the gas supply line in dependence on an operating status of the fuel cell.

3 Claims, 4 Drawing Sheets

(51) Int. Cl.
  *H01M 8/04858* (2016.01)
  *H01M 8/04089* (2016.01)
  *H01M 8/04223* (2016.01)
  *H01M 8/0438* (2016.01)
  *H01M 8/0444* (2016.01)
  *H01M 8/04537* (2016.01)
  *H01M 8/04746* (2016.01)
  *H01M 8/04791* (2016.01)

(52) U.S. Cl.
  CPC ... *H01M 8/04097* (2013.01); *H01M 8/04223* (2013.01); *H01M 8/04253* (2013.01); *H01M 8/04302* (2016.02); *H01M 8/04395* (2013.01); *H01M 8/04455* (2013.01); *H01M 8/04559* (2013.01); *H01M 8/04589* (2013.01); *H01M 8/04753* (2013.01); *H01M 8/04798* (2013.01); *H01M 2250/20* (2013.01); *Y02T 90/32* (2013.01)

(56) References Cited

U.S. PATENT DOCUMENTS

| | | |
|---|---|---|
| 2002/0058167 A1 | 5/2002 | Charlat |
| 2008/0038602 A1 | 2/2008 | Yu et al. |
| 2009/0098427 A1* | 4/2009 | Reiser ............... H01M 8/04089 429/415 |
| 2009/0220831 A1 | 9/2009 | Reoser et al. |
| 2009/0305099 A1 | 12/2009 | Chowdhury et al. |
| 2010/0310955 A1* | 12/2010 | Yadha ............... H01M 8/04231 429/429 |
| 2016/0204455 A1* | 7/2016 | Kemmer ............. H01M 8/0488 429/429 |

FOREIGN PATENT DOCUMENTS

| | | |
|---|---|---|
| DE | 102009023882 | 12/2009 |
| JP | S63181267 A | 7/1988 |
| JP | 2003197229 A | 7/2003 |
| JP | 2005295697 | 10/2005 |
| JP | 2007506896 A | 3/2007 |
| JP | 2013149538 A | 8/2013 |
| WO | 2010031601 | 3/2010 |
| WO | 2012007989 A1 | 1/2012 |

OTHER PUBLICATIONS

International Search Report for Application No. PCT/EP2014/063816 dated Sep. 10, 2014 (English Translation, 3 pages).

* cited by examiner

SIMPLIFICATION OF THE ELECTRICAL SYSTEM OF FUEL CELLS BY MEANS OF DEPLETION OF THE CATHODE SUPPLY

BACKGROUND OF THE INVENTION

The present invention relates to a fuel cell system, comprising at least one fuel cell, wherein the fuel cell comprises an anode chamber and a cathode chamber separated from the anode chamber, and wherein the fuel cell system also comprises a cathode gas source, a gas supply line, which is connected to the cathode gas source, and an exhaust air line, which is connected to the cathode chamber. The preset invention further relates to a method for operating a fuel cell by means of the fuel cell system.

Fuel cells are separated for safety reasons from the high-voltage (HV) network or the on-board electrical system by means of contactors, in particular primary contactors, of the fuel cell system. The contactors are closed only during operation, for example during operation of a vehicle operated with the fuel cell, and the fuel cell is connected to the HV on-board electrical system. When the vehicle is shut down, i.e. when the vehicle is switched off, the primary contactors are again opened and the fuel cell is again separated from the HV on-board electrical system of the vehicle until the next start-up process.

During a start-up procedure of the vehicle, the fuel cell is separated from the HV on-board electrical system in a known manner. This is due to the fact that, according to the prior art, high differences in voltage of up to several hundred volts can occur between the fuel cell and the on-board electrical system at the end of the start-up process. These differences in voltage occur because the fuel cell or, respectively, a fuel cell stack is heated up in the first step of the process when starting the vehicle under freezing conditions. This is done in order to prevent the gas channels from freezing during normal operation. After the fuel cell or fuel cell stack has therefore achieved a sufficient voltage of, for example, 400 V, a precharging resistor comprising its own contactor is generally used in order to prevent damage to the on-board electrical system. In so doing, a small current flows through the relatively high-impedance resistor.

The precharging resistor comprising its own contactor is in a known manner either integrated in the DC/DC converter downstream of the fuel cell or, respectively, fuel cell stack or is constructed from discrete components. Because the required components for integrating a precharging resistor comprising its own contactor into the DC/DC converter or the individual components are used in the HV range, said components contribute decisively to the system costs of the fuel cell system. In addition, the components for the precharging resistor comprising its own contactor take up a significant amount of installation space.

A precharging resistor comprising its own contactor in a fuel cell system is known, for example, from the Japanese patent application JP2005295697A. The function of the precharging resistor is to match the fuel cell voltage with an on-board electrical system voltage. If the voltage between the on-board electrical system and the fuel cell or, respectively, the fuel cell stack is matched via the precharging resistor, the primary contactors are closed and the current flows through the main path which connects the fuel cell to the on-board electrical system. In the process, the contactor of the precharging resistor is opened and the start-up process of the fuel cell is completed after this step.

The German patent application DE 101 27 892 A1 discloses a start control device for a vehicle comprising a fuel cell. During the start-up process of the fuel cell, a circuit comprising a current limiter is used, said circuit preventing a direct connection of the fuel cell to a load network comprising an energy storage unit. This is performed inter alia by the current limiting device until a difference between the output voltage of the fuel cell and a voltage of the energy storage unit achieve a predetermined voltage difference. As a result, an inflow of high current from the fuel cell to the energy storage unit is prevented according to said German patent application DE 101 27 892 A1.

The German patent application DE 10 2009 023 882 A1 discloses a system and a method for improving the start-up reliability of a fuel cell system. Provision is thereby made for a high-frequency resistance measurement of the fuel stack to be provided, wherein one or a plurality of correction measures can be taken on the basis of the measurement results in order to prevent the membranes of the fuel cell stack from drying out. One of these correction measures can entail limiting an airflow to the cathode side of the fuel cell stack. This has the result of reducing the drying effect of the cathode air on the membranes.

SUMMARY OF THE INVENTION

The aim of the invention is to at least in part rectify the disadvantages stated above under "Technical Field". It is furthermore particularly the aim of the invention to reduce the costs of a fuel cell system and to reduce the size thereof by eliminating the precharging resistor comprising the corresponding inherent contactor. In addition, it is the aim of the present invention to provide a fuel cell system which allows for an operating strategy or, respectively, the operation thereof in which a depletion of the air supply, in particular a depletion of the cathode air, takes place at the end of the start-up process.

This aim is met on the basis of a fuel cell system according to the invention in combination with the distinguishing features thereof. Said aim is furthermore met on the basis of a method according to the invention in combination with the distinguishing features thereof.

In general, provision is made in the fuel cell system according to the invention or, respectively, in the inventive method for operating said fuel cell system for the fuel cell to be operated under depletion of the cathode air at the end of the start-up process of said fuel cell. As a result, the possible current and thus the possible voltage in the fuel cell is limited.

The fuel cell system according to the invention includes the technical teaching that the gas supply line and the exhaust air line are connected via at least one gas-flow regulation element, which opens the gas supply line in the direction of the exhaust air line and/or the exhaust air line in the direction of the gas supply line in dependence on an operating status of the fuel cell. As a result of exhaust air entering into the gas supply line via the gas-flow regulation element, i.e exhaust air being mixed with cathode gas, a diluting of the cathode gas results in the gas supply line and ultimately in the cathode chamber connected to the gas supply line. Hence, the current or, respectively, the voltage applied in the fuel cell can be effectively reduced during a startup (particularly under freezing conditions) in order to lower the voltage level of the fuel cell after the startup (particularly under freezing conditions) thereof to the voltage level of the HV on-board electrical system in order to then connect the fuel cell via primary contactors to the HV on-board electrical system upon achieving approximately the voltage level of the HV on-board electrical system. In addition, the cathode gas can be led via the gas-flow regulation element into the exhaust air line before reaching the cathode chamber in order to deplete the cathode gas in the cathode chamber, wherein the gas-flow regulation element and the connection of the gas supply line in the direction of the exhaust air line have the function of a bypass or, respectively, a bypass throttle valve, via which the air is led past the cathode chamber.

In both cases, namely when diluting the cathode gas with the exhaust air as well as when leading the cathode gas past the cathode chamber via a bypass, a depletion of the cathode gas in the cathode chamber and therefore a voltage drop in the fuel cell result.

The depletion of the cathode gas in the cathode chamber can, of course, also occur by a combination of diluting the cathode gas by means of the exhaust air and leading the cathode gas past the cathode chamber via a bypass.

The connection of the exhaust air line to the gas supply line can take place via two gas-flow regulation elements in a manner which is adapted to the functions thereof, wherein a gas-flow regulation element connects the exhaust air in the direction of the exhaust air flow to the gas supply line and wherein the other gas regulation element connects the gas supply in the direction of the gas flow to the exhaust air line in the direction opposite to the first gas-flow regulation element.

For the purpose of miniaturizing the fuel cell system according to the invention, it is, of course, also conceivable to design the gas-flow regulation element in such a manner that said element opens in both directions, namely, on the one hand, to conduct the exhaust air into the gas supply line and, on the other hand, to conduct the cathode gas into the exhaust air line.

A fuel cell which is operated in the fuel cell system according to the invention can comprise a single fuel cell and also likewise a fuel cell stack, wherein the invention is described below in a nonrestrictive manner for one fuel cell operated in the fuel cell system. The fuel cell thus comprises an anode chamber that includes an anode and a cathode chamber that includes a cathode, which, for example, are separated from one another by a suitable electrolyte membrane. The operating status of the fuel cell is to be presently understood as the operation of the fuel cell during startup thereof, i.e. when starting said fuel cell and in particular when starting said fuel cell under freezing conditions, and the operation of the fuel cell after the startup thereof, namely during operation with the HV network respectively the HV on-board electrical system, for example, of a vehicle, in particular of a motor vehicle.

A gas-flow regulation element within the scope of the present invention can particularly be an element with which the gas or, respectively, the exhaust air can be regulated, respectively the exhaust air can be directed into the gas flow or the gas can be directed into the exhaust air flow. In the case of the exhaust air branching off via the gas-flow regulation element into the gas supply line for the cathode gas, said gas is diluted by the exhaust air or, respectively, by the fuel cell exhaust gas. As a result, the gas-flow element takes on the function of an exhaust air or, respectively, exhaust gas recirculation throttle valve.

A cathode gas source within the scope of the present invention can particularly be a source of a gas which is introduced into a cathode in a conventional manner and is conducted out of the cathode or, respectively, the cathode chamber while taking into account the reaction taking place in the cathode chamber during the operation of the fuel cell. The cathode gas source can particularly be the ambient air surrounding the fuel cell system. As a general rule, the cathode gas relates to oxygen from the ambient air.

The cathode gas source is connected in an advantageous manner to a gas supply line, through which the cathode gas is led into the cathode chamber. The gas supply line can, for example, be a suitable line or also a connection of the cathode gas source to the cathode chamber.

In an advantageous manner, the air depletion of the cathode air can also take place by lowering a rotational speed of a compressor, in particular of an air compressor, which is particularly connected to the gas supply line. The air compressor is preferably a turbo compressor unit which is disposed between the two gas flow regulation elements in the fuel cell system and which can be used in accordance with the invention by throttling the rotational speed or lowering the mass flow of the cathode gas.

In a particularly preferred manner, at least one air mass flow sensor is connected to the gas supply line for determining the oxygen content, i.e. for determining the cathode gas.

In addition to the gas flow regulation element, which connects the exhaust air line in the direction of the exhaust air stream, at least one further gas regulation element is connected to an exhaust air line, via which the gas from the cathode chamber can be discharged. In order to discharge exhaust air from the cathode chamber into the surrounding environment of the fuel cell system, the exhaust air line is connected to the cathode chamber.

In fuel cell systems without exhaust air or, respectively, exhaust gas recirculation via the gas-flow regulation element into the gas supply line or in systems without fuel cell or fuel cell stack bypass, the air mass flow sensor is preferably connected to the gas supply line upstream of the compressor. The compressor is in this case disposed between the cathode chamber and the air mass flow sensor.

In systems without exhaust air or, respectively, exhaust gas recirculation, the air mass flow sensor is disposed upstream of the fuel cell and is connected to the gas supply line.

In systems having exhaust air or, respectively, exhaust gas recirculation, the air mass flow sensor is advantageously connected in combination with a lambda sensor to the gas supply line upstream of the fuel cell.

A connection of the fuel cell to the on-board electrical system is established only after limiting the voltage by means of depleting the cathode air, namely preferably only then if the voltage levels of the HV on-board electrical system and the fuel cell have been at least approximately equalized. To this end, the primary contactors are engaged. The electrical current is at this point limited to a lower value, which lies far under the maximum current of the fuel cell, by means of the reduced oxygen supply or, respectively, by means of the reduction or dilution of the cathode gas. As a result, damage to electrical components in the HV on-board electrical system and the fuel cell system can be prevented in a simple manner and the long-term durability of the HV on-board electrical system and in particular the fuel cell can be increased.

Complex and cost intensive circuits, for example by integrating a precharging resistor comprising its own contactor, for compensating a high voltage difference can thus be avoided.

After switching on the primary contactors, the current or, respectively, cathode gas restriction, in particular the oxygen quantity restriction, can be lifted; thus enabling the desired current to flow for the normal operation of, for example, the vehicle. The switching on of the primary contactors particularly constitutes in this case the end of the start-up process (under freezing conditions).

In order to avoid repetitive descriptions of the advantages of the method according to the invention, reference is made to the advantageous design of the parking assistance system according to the invention as well as to the figures and the associated description of said figures and these will be referred to in their complete entirety.

BRIEF DESCRIPTION OF THE DRAWINGS

Further measures which improve the invention will be explained in detail below together with the description of a preferred exemplary embodiment of the invention with the aid of the drawings.

In the drawings.

DETAILED DESCRIPTION

In the different figures, identical parts are always provided with the same reference signs, which is why said parts are also as a rule only described once.

Figure 1:
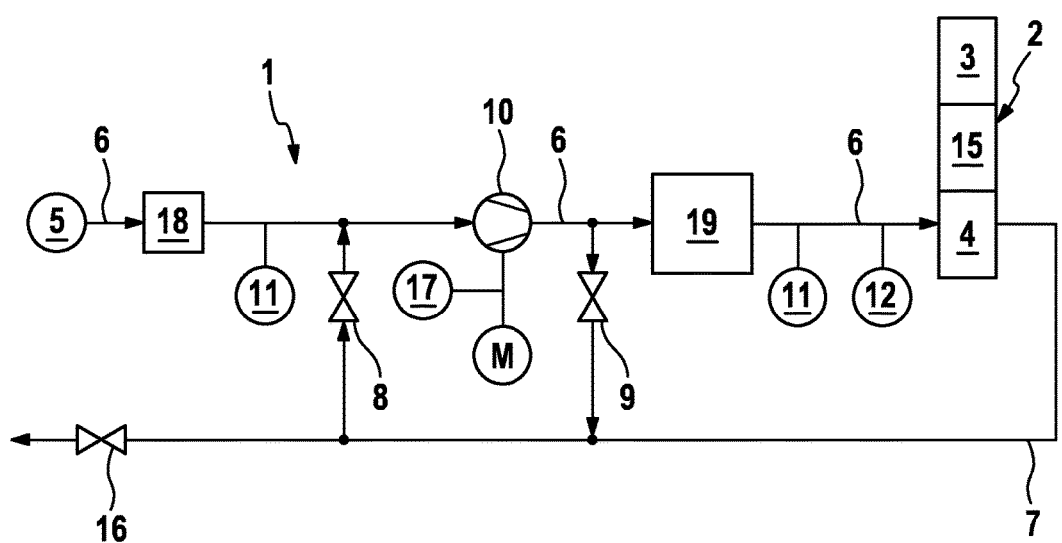
FIG. 1 shows a possible topology of an air system of a fuel cell system for implementing the connection of a fuel cell to the HV on-board electrical system without a precharging resistor and corresponding protection.

In FIG. 1, a possible topology of an air system for the fuel cell system 1 according to the invention is shown. The fuel cell system 1 comprises a fuel cell 2 which has an anode chamber 3 and a cathode chamber 4 which is separated from the anode chamber 3 by means of a fuel cell stack cooling system 15. The cathode chamber 4 is connected via a gas supply line 6 to a cathode gas source 5, in this case to the ambient air. In addition, the cathode chamber 4 is connected to an exhaust air line 7 via which reaction gas is conducted out of the cathode chamber 4. A gas-flow regulation element for throttling the exhaust air is connected to the exhaust air line 7 at the end of said exhaust air line 7, i.e. at the end of the exhaust air flow. Furthermore, further gas flow regulation elements 8 and 9 are disposed between the exhaust air line 7 and the gas supply line 6, which connect the exhaust air line 7 and the gas supply line to one another in such a way that said lines can be regulated. The gas-flow regulation element 8, which acts here as an exhaust gas recirculation throttle, has the function of conducting exhaust air out of the exhaust air line 7 into the gas supply line 6 in order to dilute the cathode gas with the exhaust air.

The gas flow regulation element 9 acts in contrast as a bypass throttle valve and therefore has the function of conducting cathode gas past the cathode chamber 4. A compressor 10 is disposed in the gas supply line 6 between the gas-flow regulation element 8 and the gas-flow regulation element 9. The mass flow of the cathode gas can thus be regulated via the rotational speed of the compressor 10. The mass flow of the cathode gas can particularly be reduced by reducing the rotational speed of said compressor 10. A rotational speed detector 17 is disposed in the region of said compressor 10, via which detector the mass flow of the cathode gas and furthermore particularly the oxygen content of the cathode gas can be indirectly determined by means of determining the rotational speed of said compressor. An air filter 18 is disposed in the gas supply line 6 in a typical manner upstream of the compressor 10, said air filter 18 being used, for example, to separate dust particles so that said particles do not enter into the fuel cell system 1 and particularly do not enter into the fuel cell 2. An air mass flow sensor 11, which is used to determine the amount of gas being supplied to the cathode, is disposed in the gas supply line 6 upstream of the compressor 10 in the direction of the gas stream to the cathode chamber 4. Downstream of the compressor 10 and downstream of the controllable discharge line of the cathode gas via the gas flow regulation element 9, a heat exchanger 19, which is used simultaneously as a humidifier, is connected in a typical manner to the gas supply line 6 upstream of the cathode chamber 4.

A further air mass flow sensor 11 and a lambda sensor 12, which are used in combination with each other to determine and measure the oxygen content of the gas entering the cathode or, respectively, the dilution of said gas with the exhaust air, which can be fed via the gas-flow regulation element 9 into the gas supply line 6, are disposed downstream of the heat exchanger 19 respectively humidifier.

Figure 2:
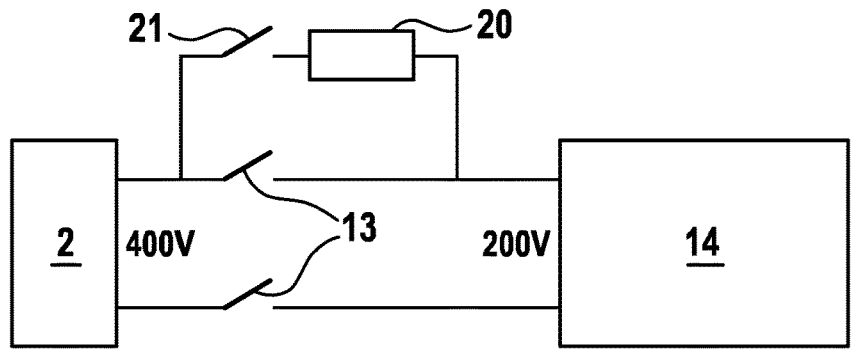
FIG. 2 shows schematically the connection of a fuel cell to a HV on-board electrical system via a precharging resistor, which comprises its own contactor, as well as primary contactors.
Figure 3:
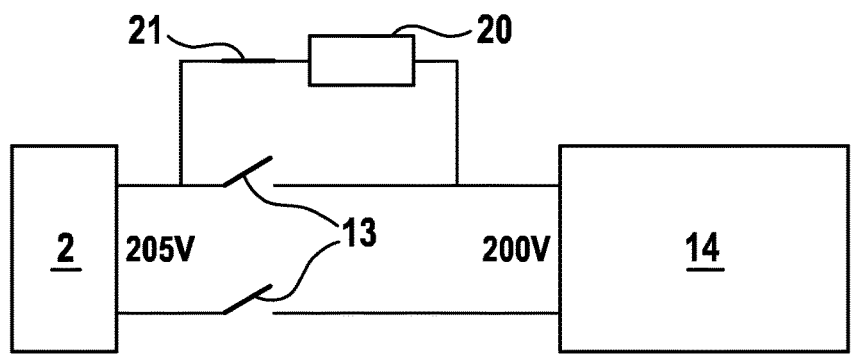
FIG. 3 shows typical voltages at the fuel cell and the HV on-board electrical system after switching on the precharging resistor protection.

FIG. 2 and FIG. 3 show the connection of a fuel cell 2 known from the prior art or, respectively, of a known fuel cell system 1 to the HV on-board electrical system 14 of, for example, a vehicle, said on-board electrical system having 200 V. In order to initiate a start-up process of the fuel cell 2, i.e. when starting the fuel cell 2 under freezing conditions, the fuel cell 2 is started until achieving a voltage of presently 400V for the purpose of heating up said fuel cell 2 in order to prevent the gas channels from freezing during normal operation. In so doing, the primary contactors 13 are open and the contactor 21 inherent in the precharging resistor 20 is open as depicted in FIG. 1. After the fuel cell 2 has achieved this voltage, the precharging resistor 20 comprising its own contactor 21 is closed as shown in FIG. 3. The current flows in this case through the high-impedance precharging resistor 20 and is thereby reduced to approximately the voltage level of the HV on-board electrical system 14, in the present case to 205 V. If the current which is generated by the fuel cell 2 has achieved approximately the voltage level of the HV on-board electrical system 14, the primary contactors 13 close and the start-up process (under freezing conditions) of the fuel cell 2 is thereby completed.

Figure 4:
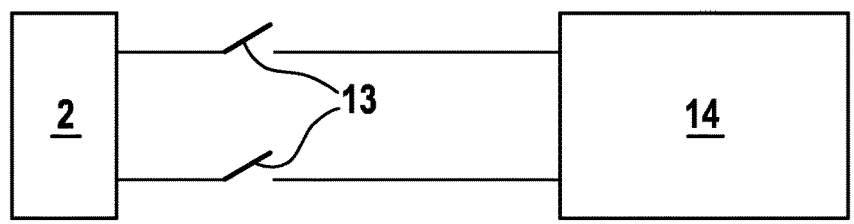
FIG. 4 shows an inventive connection of a fuel cell to an HV on-board electrical system without a precharging resistor comprising its own contactor.

FIG. 4 shows the connection of the fuel cell system according to the invention to an HV on-board electrical system 14. As can be seen, the fuel cell system 1 according to the invention is implemented without a precharging resistor comprising its own contactor. Said inventive fuel cell system 1 is connected to the HV on-board electrical system 14 via the primary contactors 13 only to complete the startup of the fuel cell 2 (under freezing conditions). In the present example, the primary contactors 13 are however open.

Figure 5:
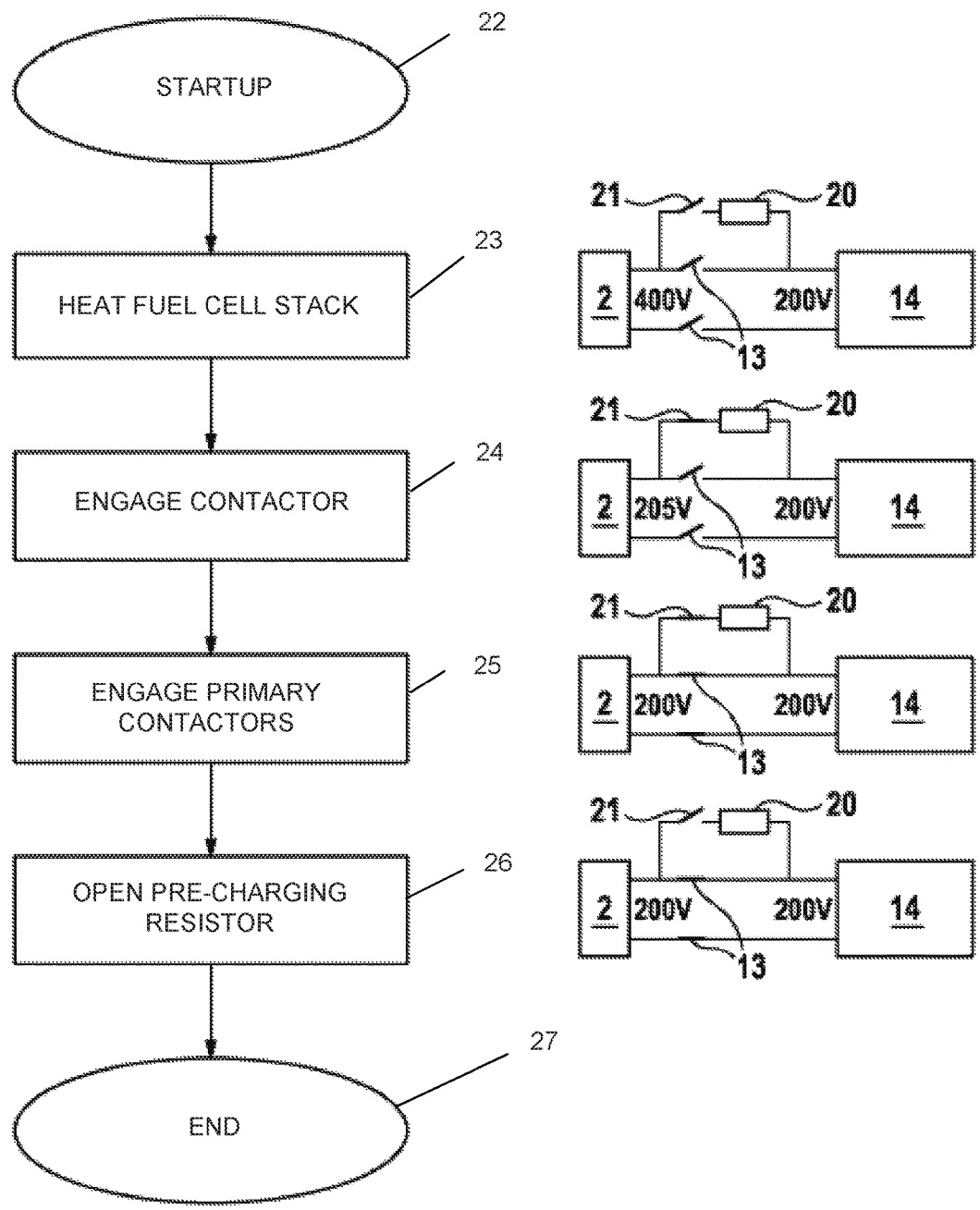
FIG. 5 shows on the left side thereof a start-up procedure which includes a precharging resistor comprising its own contactor and on the right side thereof the switching state which corresponds to the left side and comprises typical voltage values.

FIG. 5 shows an operating strategy of a start-up procedure of a connection of a fuel cell 2 to the HV on-board electrical system 14, said connection being depicted in FIGS. 2 and 3 and including a precharging resistor comprising its own contactor. In addition to the individual steps, the typical voltages applied to the HV on-board electrical system 14 and the fuel cell are depicted on the right side in FIG. 5 at the corresponding switching state of the contactor of the precharging resistor or, respectively, the primary contactors 13. After initiating the start-up procedure 22, for example when switching on or starting a vehicle, the fuel cell 2 or, respectively, the fuel cell stack is heated up in a first step 23. In so doing, the fuel cell 2 achieves a voltage of 400 V. In contrast, a voltage of 200 V is applied to the HV on-board electrical system. The voltage difference therefore amounts to 200 Volts. After the fuel cell 2 is heated up, the precharging resistor 20 comprising its own contactor 21 is engaged in a succeeding step 24 and reduces by means of high-impedance resistance the voltage applied by the fuel cell 2, more precisely stated, the voltage going out from said fuel cell 2 to approximately the voltage level of the HV on-board electrical system, namely in the present example to approximately 200 V or more precisely stated to 205 V. After the adaptation of the voltage levels of the voltage of the fuel cell 2 and that of the HV on-board electrical system 14, the primary contactors 13 are engaged in a succeeding step 25. In a following step 26, which occurs prior to the end of the startup 27 (under freezing conditions), the precharging resistor opens and is thus separated from the fuel cell 2 and the HV on-board electrical system 14.

Figure 6:
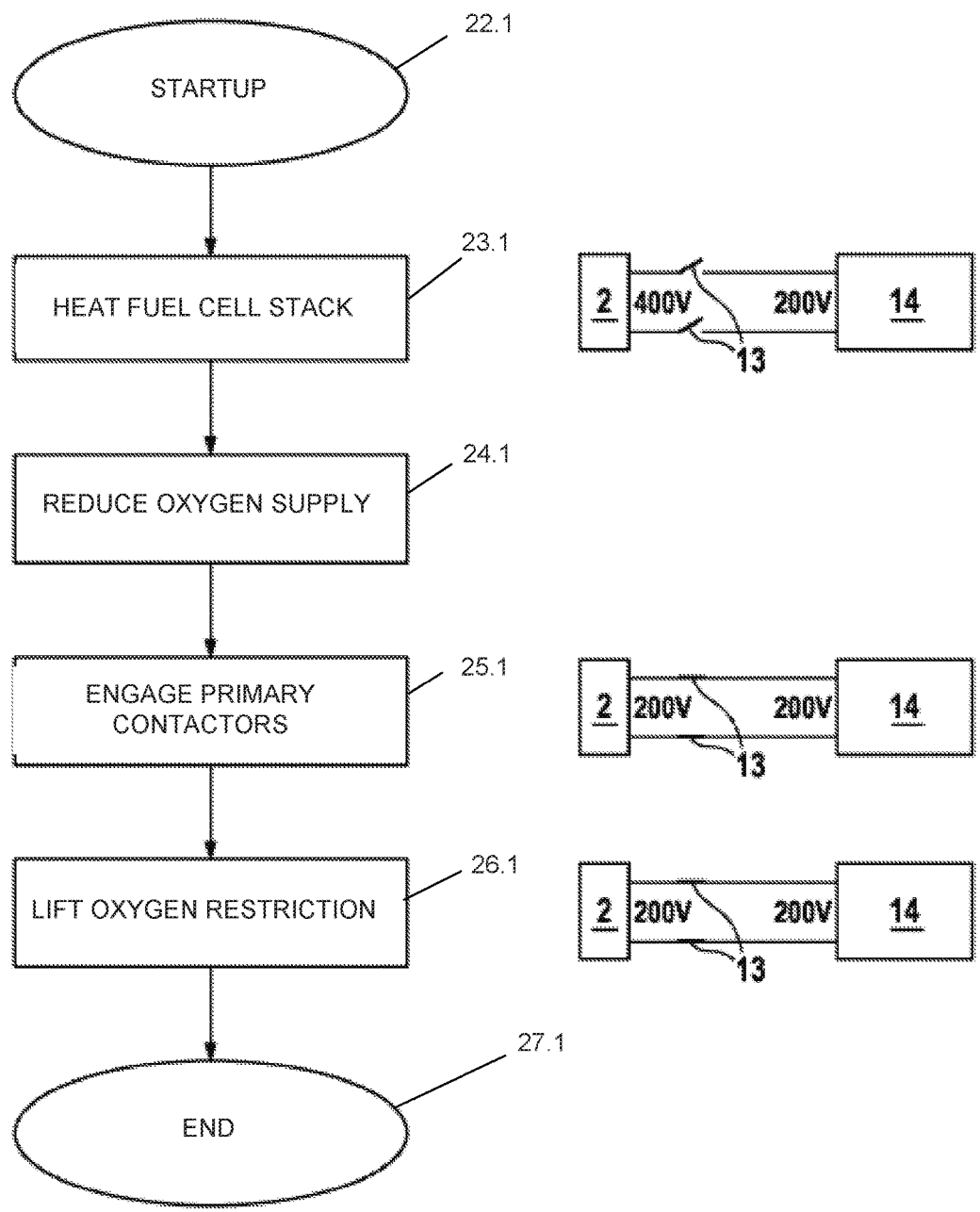
FIG. 6 shows on the left side thereof the start-up procedure according to the invention without a precharging resistor comprising its own contactor and on the right side thereof the switching state which corresponds to the left side and comprises typical voltage values.

FIG. 6 shows the start-up procedure of a fuel cell 2 comprising the fuel cell system 1 according to the invention, more precisely stated comprising the electrical topology thereof, i.e. without a precharging resistor 20 comprising its own contactor 21. The switching states having typical voltages are depicted on the right side. After initiating the start-up process 22.1, for example when switching on or starting a vehicle, the fuel cell 2 or, respectively the fuel cell stack, is heated up in a first step 23.1. In so doing, the fuel cell 2 achieves a voltage of 400 V. In contrast, a voltage of 200 V is applied to the HV on-board electrical system 14. The voltage difference thus amounts to 200 volts. After the fuel cell 2 is heated up, the current to be produced by the fuel cell 2 is restricted by reducing the supply of oxygen in step 24.1. As previously described with regard to FIG. 1, the oxygen is restricted, for example, by reducing the rotational speed of the compressor 10, by diverting the air through a bypass or by diluting the air with exhaust air.

After ensuring that a small amount of oxygen is present in the cathode, the primary contactors 13 are engaged in a following step 25.1. The electrical current is restricted to a low value, which is much smaller than the maximum current, as a result of the reduced oxygen supply. Hence, damage or even a reduction of service life of critical electrical components is prevented. In the present example, the voltage of the fuel cell 2 is reduced to the voltage level of the HV on-board electrical system 14, namely to 200 volts as depicted.

After engaging the primary contactors 13, the restriction of the amount of current or, respectively, oxygen is lifted in step 26.1; thus enabling the desired current to flow for the normal operation. The startup process then ends at step 27.1.

The invention is not restricted in the implementation thereof to the preferred exemplary embodiment specified above or, respectively, to the method specified above; but rather a number of variants are conceivable which make use of the depicted solution even if the embodiments are of a fundamentally different design. All of the features and/or advantages coming from the description or the drawings, including constructive details, spatial arrangements and procedural steps can be fundamental to the invention in isolation as well as in a variety of combinations.

The invention claimed is:

1. A method for operating a fuel cell (2) by a fuel cell system (1), wherein the fuel cell (2) comprises an anode chamber (3) and a cathode chamber (4) separated from the anode chamber (3), and wherein the fuel cell system (1) also comprises a cathode gas source (5), a gas supply line (6), which is connected to the cathode gas source (5), for feeding cathode gas into the cathode chamber (4), and an exhaust air line (7), which is connected to the cathode chamber (4), for conducting exhaust air out of the cathode chamber (4), and wherein the gas supply line (6) and the exhaust air line (7) are connected by at least one gas-flow regulation element (8, 9), which opens the gas supply line (6) in the direction of the exhaust air line (7) and/or the exhaust air line (7) in the direction of the gas supply line (6) in dependence on an operating status of the fuel cell (2), comprising the following procedural steps:
  a) startup of the fuel cell (2),
  b) restricting the voltage generated by the fuel cell (2) by diverting some of the cathode gas into the exhaust air line (7) by the gas-flow regulation element (9) connected to the gas supply line (6) between the compressor (10) and the fuel cell (2), reducing the amount of cathode gas fed into the cathode chamber (4) of the fuel cell (2),
  c) engaging primary contactors (13) which connect the fuel cell (2) to a HV on-board electrical system (14),
  d) lifting the restriction of the voltage generated by the fuel cell (2).

2. The method according to claim 1, characterized in that, when feeding exhaust air into the gas supply line (6), the oxygen content of the cathode gas is measured by at least one lambda sensor (12) prior to feeding the cathode gas into the cathode chamber (4).

3. The method according to claim 1, wherein startup of the fuel cell (2) occurs during freezing conditions.

\* \* \* \* \*